United States Patent [19]

Rouille et al.

[11] Patent Number: 4,812,000
[45] Date of Patent: Mar. 14, 1989

[54] SYSTEM FOR GENERATING FRAME SWEEPING WITH LASER BEAM, IN PARTICULAR FOR PROJECTING IMAGES

[75] Inventors: Philippe Rouille, Elancourt; Roland Jezequel, Gauthier, both of France

[73] Assignee: Thomson-CSF, Paris, France

[21] Appl. No.: 31,411

[22] Filed: Mar. 30, 1987

[30] Foreign Application Priority Data

Apr. 2, 1986 [FR] France ................................ 86 04693

[51] Int. Cl.$^4$ ........................ G02B 26/08; G02B 26/10
[52] U.S. Cl. ........................................ 350/6.6; 350/6.5
[58] Field of Search ............. 350/354, 356, 355, 6.91, 350/6.9, 6.8, 6.7, 6.6, 6.5, 6.4, 6.3, 6.2, 6.1

[56] References Cited

U.S. PATENT DOCUMENTS

| | | |
|---|---|---|
| 3,801,180 | 4/1974 | MacGuire et al. |
| 4,213,146 | 7/1980 | Maiman ................................ 350/6.6 |
| 4,348,109 | 9/1982 | Auterson ............................ 350/6.91 |
| 4,386,851 | 7/1983 | Eidorff ................................ 356/254 |
| 4,468,119 | 8/1984 | Hamar ................................. 350/6.4 |
| 4,606,601 | 8/1986 | Starkweather ...................... 350/6.9 |

Primary Examiner—Eugene R. LaRoche
Assistant Examiner—Nathan W. McCutcheon
Attorney, Agent, or Firm—Oblon, Fisher, Spivak, McClelland & Maier

[57] ABSTRACT

The system for generating and projecting laser images comprises essentially a deflector with two pencil galvanometers and a rotator with prisms, the laser beam being modulated by a modulator with two tracks, and a sweeping generator producing line and frame signals in the form of saw teeth without synchronization dots, and it is applied to a training simulation for aerial combat.

10 Claims, 6 Drawing Sheets

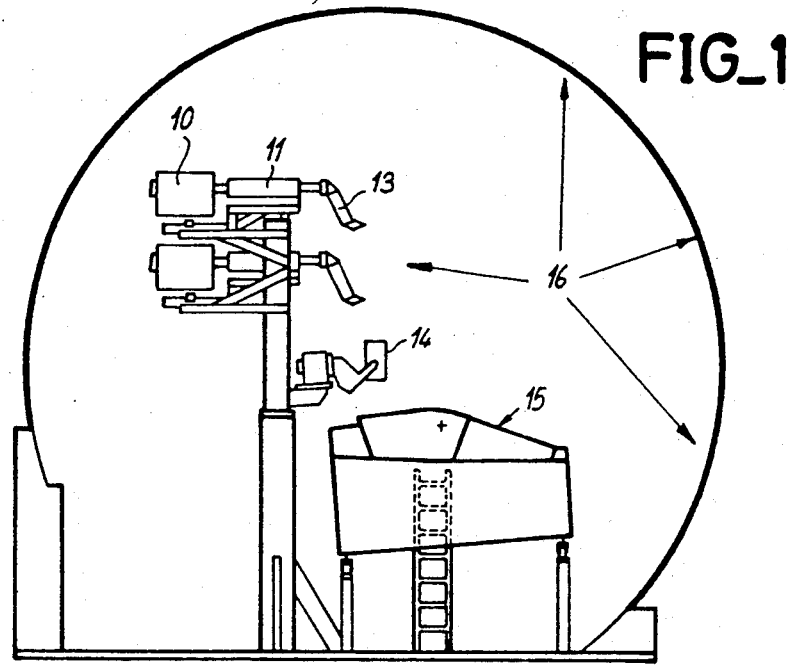
FIG_1
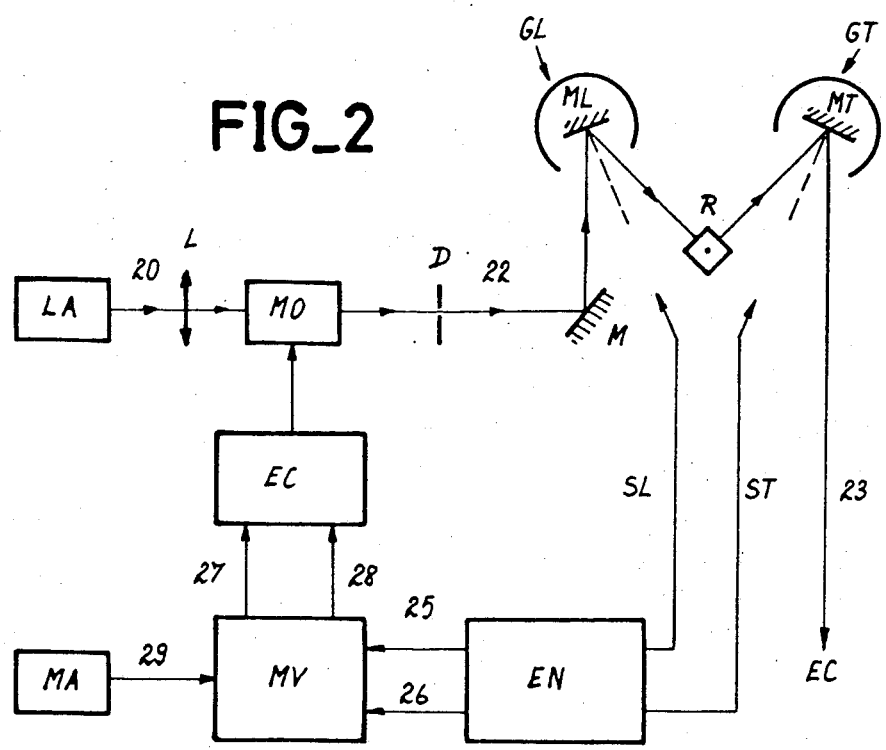
FIG_2

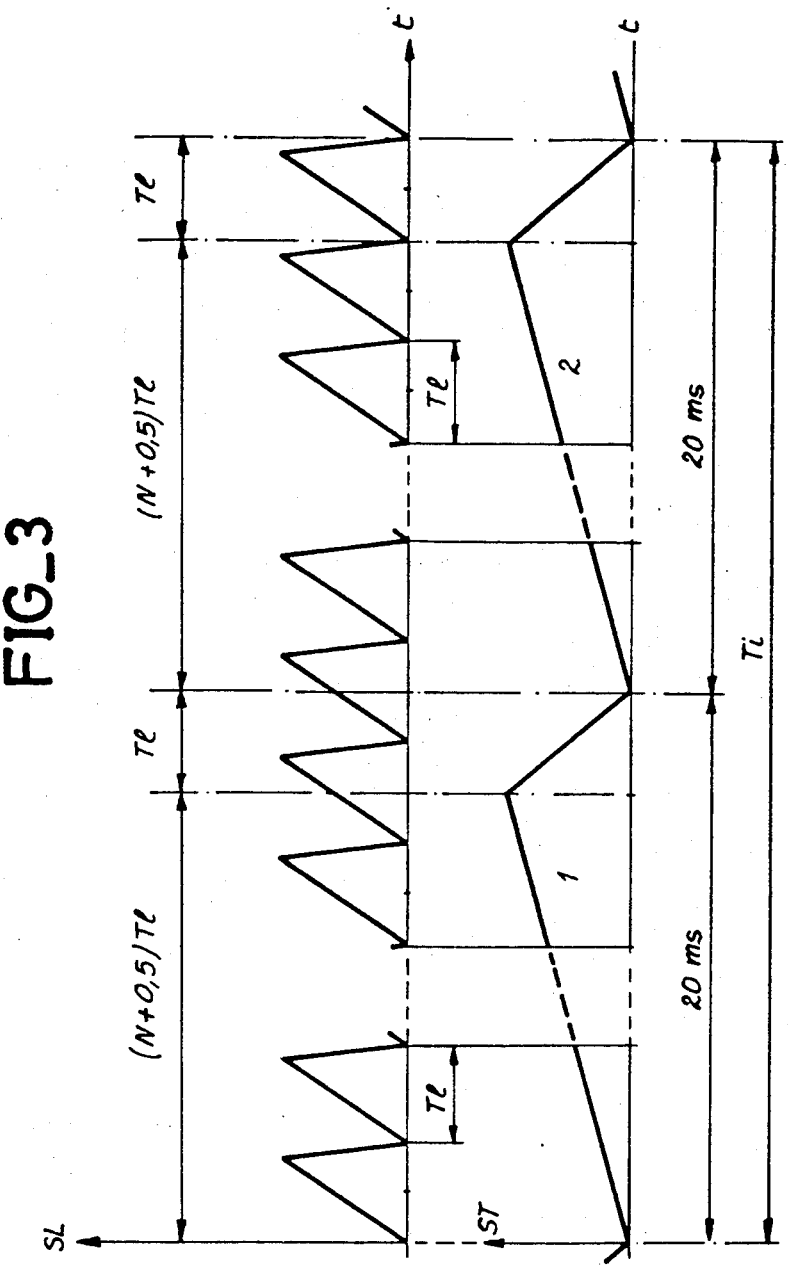

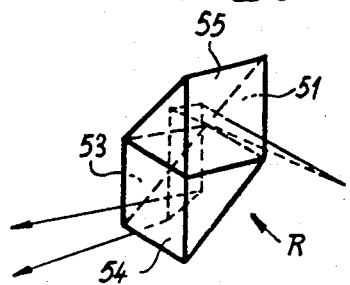
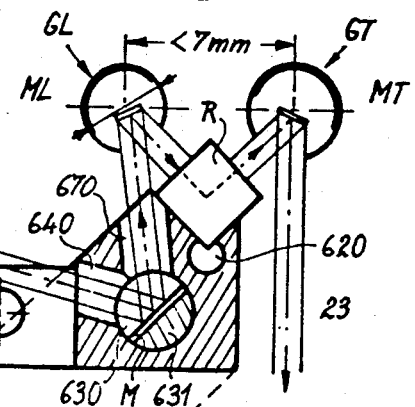
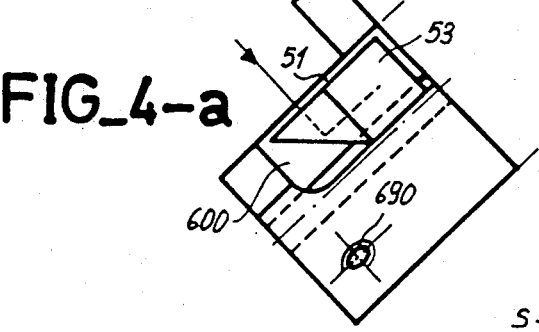
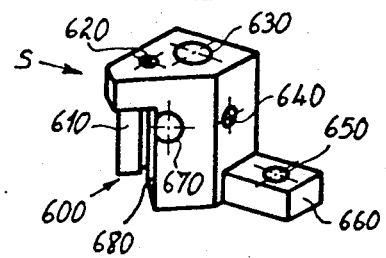
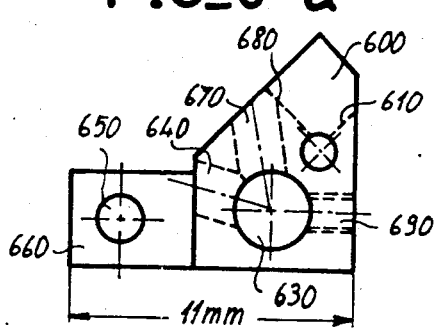
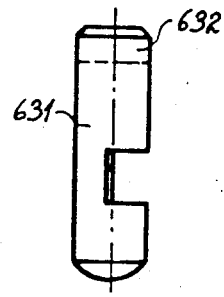
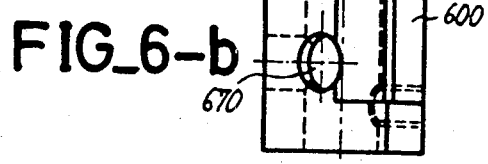

FIG_7
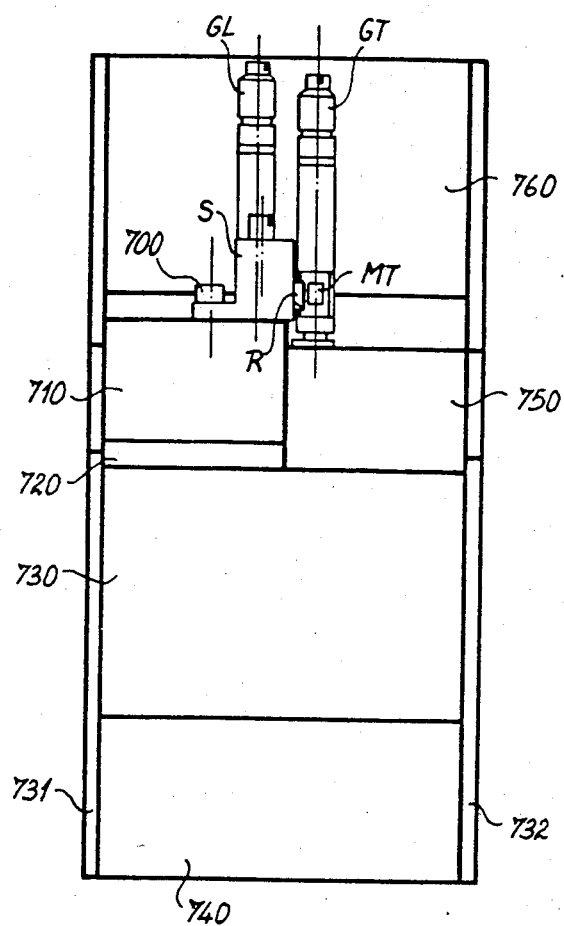

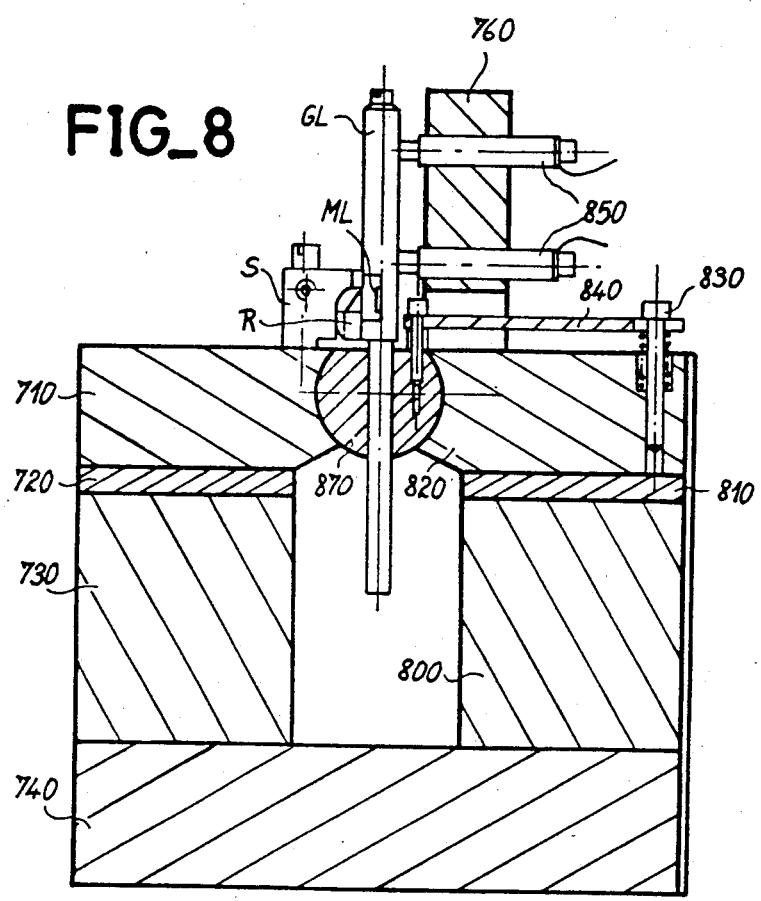
FIG_8
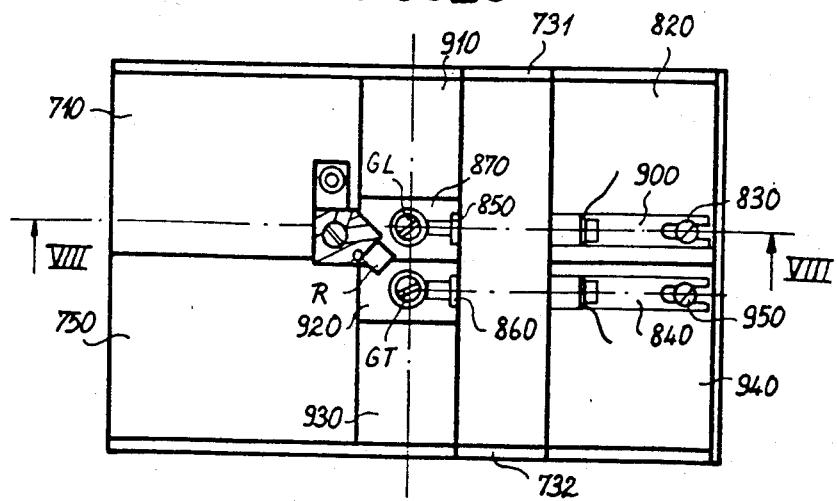
FIG_9

FIG_10
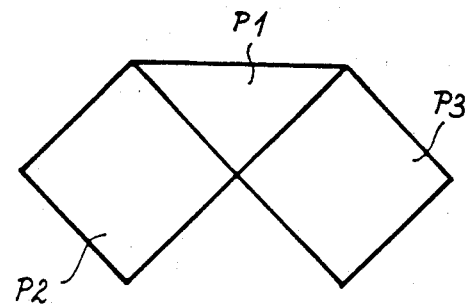
FIG_11
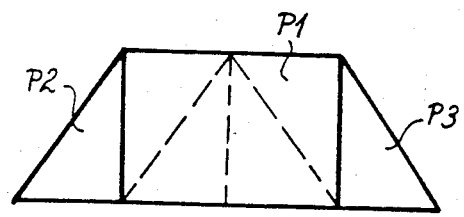
FIG_12
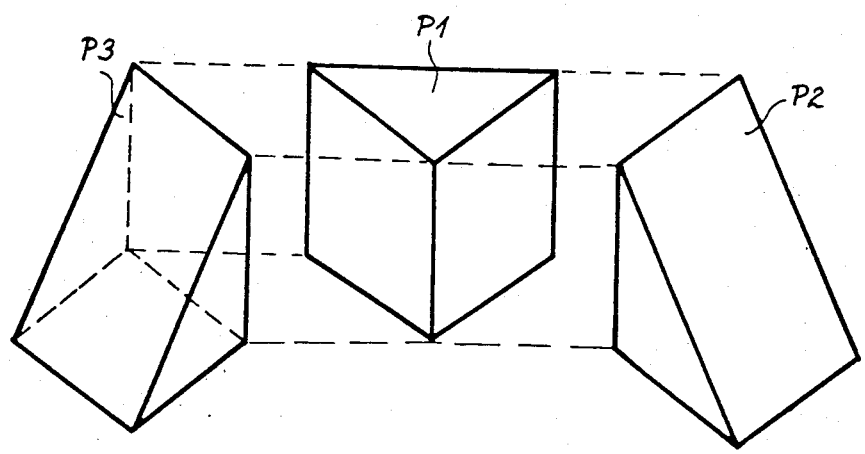

SYSTEM FOR GENERATING FRAME SWEEPING WITH LASER BEAM, IN PARTICULAR FOR PROJECTING IMAGES

BACKGROUND OF THE INVENTION

Field of the Invention

The present invention concerns a system for generating frame sweeping with laser beam, in particular for projecting images, such as images of moving objects on a wide angle image.

It also concerns, among others, the simulation of the visual environment of pilots during their aerial combat training.

This is practised in simulators comprising one or several large diameter spheres (FIG. 1) the internal surface of which constitutes a concave reflector screen 16 with wide angle. A reproduction of the cockpit 15 of a fighter plane, inside which is placed a pilot to be trained, is located at the center of each sphere.

The ground-view a well as the air-view are simulated for example by two images projected onto the sphere and produced by a projection device 14 placed above the cockpit and which comprises two fish-eye type object lenses orientated facing each other.

Images of the targets are obtained by means of projection systems placed above and to the rear of the pilot. Each of them supplies the image of a target and comprises a "light valve" image generator 10, an image transport system and an orientable projection stick 13 comprising a system of adaption and an optical deviator. Two projection systems thus supply two images of targets in good lighting and definition conditions.

A greater number of images is possible by supplying to each generator a video image formed itself from several target images. A separator thus distributes these images on a corresponding number of projection sticks.

Nevertheless, the number of target images remains limited, on the one hand, because of the diminutions, of the luminosity and of the definition of the images, and which are due to the use of the separator, and on the other hand, due to the possible occultation of the sticks between one another and the complication of the adaption and image transport systems towards the sticks. Furthermore, the projection systems through their siting and their bulkiness, reduce the field of visibility of the pilot while this field on the actual plane tends to increase constantly. Therefore, the optimum solution with this type of projection and from the point of view of images quality, seems to be supplied by a single projection system projecting four target images. This number appears nevertheless as being insufficient and seems able to be increased only through the application of novel means.

The aim of the present invention is therefore the simultaneous generation and projection through laser technique, of about ten target images.

This technique already allows the projection of object images represented by a thread-like outline, in shift sweeping, but these images lack realism. They are suitable for advertising displays. The laser beam deviations are obtained by means of two identical standard galvanometers requiring between each other due to their positioning, a combining short focus optical system which destroys the geometry of the laser beam. The target images are full video images, having thus to be resolved at all distances and to maintain, among others, the contrast and the halo absence inherent to a good quality image. They require a frame sweeping and an infinite field depth, which is only possible by means of appropriate deflectors, if possible without combining optics which imposes downstreams a focussing correction.

Deflector systems with rotating multiface mirrors are already known, with a resolution greater than that which is required for the simulation but which are expensive and bulky. Furthermore, their operating is delicate. They require a servo-speed device, a line synchronization and an adaption of the video to the faces geometry.

The systems called "scanners" with high inertia, in which a mirror integral with a soft iron core oscillates in a magnetic field, are systems of which the temporal resolution remains limited. In the conditions of use required, they are too noisy and lack linearity.

The acoustical-optical deviators are characterized by an angular deviation of about 2°, which is not enough for a target image, and require to be completed by an image enlargement by means of special optics. Their luminous yield is low and would require more powerful lasers.

Similarly, the crystal and Kerr effect electro-optical deviators have deviation angles of some minutes, which are much too low for generating a target image.

The object of the system according to the invention is the generation and the projection of a laser image, accoriing to an angular field of about ten degrees; with a maximum definition corresponding to at least 256 lines of 256 pixels, without focussing, contrasted, without halo, with a high luminous yield, and this only by putting into operation simple means of low bulkiness and costs.

SUMMARY OF THE INVENTION

The system according to the invention comprises a deflector system with two pencil galvnnometers without intermediary conjugating optics. As is well known in the art a pencil galvanometer is a pencil-like galvanometer including a small rotatable mirror instead of a needle which is fixed to the galvanometer moving coil.

According to another feature of the of the invention the image optical path between the two galvanometers is reduced by a prism rotator, at 90° and to minimal dimensions, and thus the distance between these two galvanometers with parallel axii is reduced to less than 7 mm.

Another feature of the system according to the invention is that the image of the neck of the laser constituting the luminous source, is conjugated by a lens on a mirror of the line galvanometer.

Another feature of the system according to the invention is that the beam issuing from the laser source crosses a multi-beam modulator.

According to another characteristic of the system according to the invention, the rotator is formed by two total reflection prisms, and due to this fact, the galvanometers are axially shifted with respect to each other at a distance equal to the side of a prism base.

BRIEF DESCRIPTION OF THE DRAWING

Other features, objects and advantages of the invention will appear from the following description of an embodiment, given with reference to the appended drawing in which FIG. 1 already mentioned represents an aerial combat simulation installation of a known type;

FIG. 2 represents the schematic diagram of the system according to the invention;

FIG. 3 shows the sweeping control signals applied to the galvanometers;

FIGS. 4 and 4A represent the relative dispositions of the galvanometers and of the rotator on its support;

FIG. 5 represents the prism rotator;

FIGS. 6, 6A, 6B, and 6C show the rotator support and the return mirror;

FIGS. 7, 8 and 9 represent the deflector system, and

FIGS. 10, 11 and 12 represent a rotator with three prisms; respectively seen from the side, from above and in a perspectice exploded view.

DESCRIPTION OF THE PREFERRED EMBODIMENTS

A laser generator LA (FIG. 2) emits a visible laser beam 20, having a diameter of at least 1 mm and a divergence higher than $1.10^{-3}$ rd. After having crossed through a convergent lens L, this beam is modulated in intensity by a modulator MO with a piezo transducer and optical crystal, and two tracks for example. A diaphragm D is placed at its outlet, so as to allow to pass only the two diffracted beams 22 of order 1. These two beams, apparently coinciding but modulated in distinct manners, are only separated by an angular shift of 2'.

The double beam thus formed is directed onto a deflector system represented in detail on FIGS. 6 to 9 but of which only the optical part is schematized on FIG. 2. This latter comprises principally two galvanometers GL and GT as well as a rotator R, at 90°. Their function, described herein-below, is to impose at the double laser beam two angular deviations at right angle, defined respectively by two sweeping signals ST and SL applied to the galvanometers. Because of the small size and distances between the optical elements, and taking into account the relative dispositions of the deflector system, of the screen EC and of the devices for generating the laser beam, this latter can only reach the mirror ML after reflection in an auxiliary return mirror M. The focal distance of the lens L, of about one meter is such that the conjugated optics of the laser neck is located on the mirror ML.

The sweeping signals ST and SL (FIG. 3) are analogous to television signals, with the difference, however, that they do not comprise any synchronization nor suppression impulse. Furthermore, the frame signal ST presents with respect to the line signal SL, an adjustable delay of about 50 μs that does not appear on the figure. The images have a period Ti of 40 ms and the two interlaced frames each comprise practically N sweepings of useful lines. This leads because the existence of the double laser beam, to an effective path of $2 \times 2N$ lines, or 256 line per image if $N=64$. The galvanometer GL thus presents a natural frequency, for example, of 5500 Hz whereas the frequency is 1400 Hz for the galvanometer GT. The sweeping signals are produced by an assembly EN (FIG. 2) formed by classical numerical circuits. This assembly also supplies a clock signal 25 and a frame starting signal 26. It goes without saying that by using a multibeam modulator with more than two tracks ($V>2$) of which the crystal is anistropic, it is possible to bring the definition, for example, to 1024 lines for $V=8$.

The modulator MO and the electronic control circuits EC are adapted with respect to one another and form an assembly which is commercially available. The image to be projected is stored in a video machine MA or equivalent device such as a video disk. It is transmitted (at 29) to circuits of digital memories MV which numerize and store it in two memories corresponding respectively to the even lines and odd lines of 256 pixels. These memories are read in synchronism with the signals 25 and 26 and supply modulation signals 27 and 28 to the circuits EC which modulate the double laser beam 22. The period of the signal 25 varies during the line sweeping, in function of the speed of the galvanometer GL.

The rotator R (FIG. 5) comprises two prisms of total reflection, which are identical, assembled together by gluing, by one of their bases and in such a manner that the other base is orientated at 90° from that of the other prism. The average normal luminous ray at the input base 51 of one of the prisms, reissues by the base 54 of the other, having been subjected to a deviation of 90° and a vertical displacement equal to the side of a base. Furthermore, a possible angular displacement of the incident ray in a plane parallel to the contacting bases, is transformed into a displacement of the ray issuing in a plane perpendicular thereto.

These properties allow on the one hand to return in the direction of the mirror MT, the luminous beam reflected by the mirror ML, by reducing to a maximum the optical path between these two mirrors and by avoiding in this way any conjugating optic, and on the other hand, to obtain a laser beam 23 of which the orientation results from two distinct angular deviations at right angles, by means of two mirrors ML and MT both oscillating according to vertical parallel axii. It is nevertheless necessary to do this that one of the mirrors, i.e. one of the galvanometers, the galvanometer ML for example, be vertically shifted with respect to the other.

The angular deviation provoked by the mirror ML corresponds to the line sweeping whereas those which is provoked by the mirror MT corresponds to the frame sweeping.

The two galvanometers are situated at a distance longer than 7 mm, from each other. The rotator is symmetrically placed as close as possible to these galvanometers, in such a manner that the average beam issuing from the mirror ML and that the reflected average beam towards the mirror MT are substantially perpendicular respectively to the inlet and the exit faces. Its place is effectively defined by a bracket S (FIG. 6).

The rotator is fixed to the bracket by gluing its triangular faces 51 and 53 respectively to the two faces 610 and 680 of a milling shaped form 600 at 90°. A disengagement bore 620 allows a correct bearing of the rotator against the support. The return mirror M is glued to the bottom of a machined recess 633 in an axis 631 (FIG. 6B). this is housed in a bore 630 and suitably orientated by means of a slot-screwdriver 632, so that the laser beam 22, arriving on the mirror M by a hole 640 is suitably reflected through a hole 670 on the mirror. The axis 631 is blocked by a screw passing in the threaded bore 690.

The support S is secured to a polar piece 710 of the deflector system (FIGS. 7, 8 and 9) by a screw passing into hole 650 of the part 660 of this support. The galvanometers GL and GT are commercially available devices but their characteristics: frequency, size of the mirror and orientation of said mirror with respect to the winding, have to be determined at request, as will be evident for those skilled in the art. In the ultra-violet ray recorders, a certain number of the galvanometers are placed side by side, in an identical manner with respect to the polar pieces of a same magnetic circuit.

In the systm according to the invention, the two galvanometers are vertically shifted with respect to each other. This requires, for their windings being placed in the zone of maximum magnetic flow that these galvanometers each have their own magnetic circuit or at least their own pair of polar pieces and that they be shifted with respect to each other. This can be obtained, for example, by cutting out each of the commercially available polar pieces symmetrically and perpendicularly to the airgap and by a shifting of the two polar pieces thus obtained with respect to each other.

The magnetic block of the system according to the invention (FIGS. 7, 8 and 9) is thus formed of two magnets 730 and 800 of 10,000 Gauss, of a connecting part 740, of two pairs of polar pieces 710 and 820, 750 and 940 shifted with respect to one another by shims 720 and 810. These latter pieces being wholly made of soft iron. The galvanometers are each held by inserting them into a cylindrical support 870, 920 pierced, orientable between the machined polar pieces also in a cylindrical manner. Their orientation can be adjusted by a lever 850, 900 maintained by a spring against an adjusting screw 830, 950. The two galvanometer supports are maintained against each other by two bronze barrel 910, 930 themselves held by two flanges 731, 732. The height of the galvanometers in the supports could be adjusted also by simple means (not represented). The sweeping signals are applied respectively to the galvanometers by means of two pairs of classical spring contacts 850, 860 mounted in a connecting block 760 made of plastic material.

The system according to the invention, due to its size, can be mounted, deflector system and acoustical-optical modulator assembly included, in a housing box of 100×200 mm. It is therefore easy to dispose, inside the simulation sphere, of the number of housings or boxes desired, either on each side of the cockpit, or above and to the rear of the cockpit without creating occultation zone detrimental for the simulation of aerial comvat whereas the laser can be located at the rear of under the cockpit, or even outside the sphere. To each housing, it is of course necessary to associate at the exit an optical deviator.

In one alternative of the invention (cf. FIGS. 10 to 12) the rotator is formed with three total reflection prisms. It is obtained by gluing respectively to the two bases of a first prism P1, one of the two bases of two other prisms P2, P3 so that they have their other base in a same plane. This alternative, however, lengthens the optical path between the galvanometers and lead to a projected image of smaller size. It prevents, however, the height shifting between the galvanometers.

It goes without saying that if the deflector system according to the invention, while being associated among others to an acoustical-optical modulator and to circuits for generating sweeping signals in lines and frames, is correctly adapted to the generation of a laser image, it can also generate a filiform laser image, inherent, for example, in the simulation of an A.A. firing, while being associated among others to circuits for generating sweeping signals.

We claim:

1. System for generating framed sweeping with a laser beam, in particular for the projection of images, wherein it comprises a deflector system with two pencil galvanometers each having a mirror, and a prism rotator between said galvanometers for deflecting a light beam from one of the galvanometers through 90° to the other galvanometer.

2. System according to claim 1, wherein the rotator comprises two total reflection prisms of similar size, assembled by one of their bases, so that the base of the one is orientated at 90° from that of the other prism.

3. System according to claim 2, of which the galvanometers have parallel longitudinal axes, wherein these galvanometers are axially shifted with respect to each other along said longitudinal axes by a distance equal to the side of a prism base.

4. System according to claim 1, wherein the rotator comprises three total reflection prisms, a rotator obtained by gluing respectively to the two bases of a first prism, one of the two bases of the other prisms in such a manner that they have their other base in a common plane.

5. System according to claim 1, wherein the deflector system cooperates with a device producing at least one modulated laser and, with a device for generating sweeping signals producting line and frame sweeping signals.

6. System according to claim 5, wherein said system further comprises a digital image memory connected to an image source receiving from the sweeping signal generating device clock signals and frame starting signals and controlling a laser beam modulator.

7. System according to claim 6, wherein the image of the neck of the laser source is conjugated by a lens on the mirror of said one of the galvanometers.

8. Systems according to claim 7, wherein the beam issuing from the laser source crosses through a multibeam modulator.

9. System according to claim 8, wherein a diaphragm is placed at the exit of the laser beam modulator, so as to allow to pass only those beams of order 1.

10. System according to claim 9, wherein a return mirror is disposed upstream from the deflector system, the focal distance of the said lens being such that the conjugated optics of the neck of the laser source is situated on the mirror of said one of the galvanometers of the deflector system.

* * * * *